E. A. LE BEAU.
BRAKE BEAM.
APPLICATION FILED AUG. 11, 1909.
1,020,563.
Patented Mar. 19, 1912.
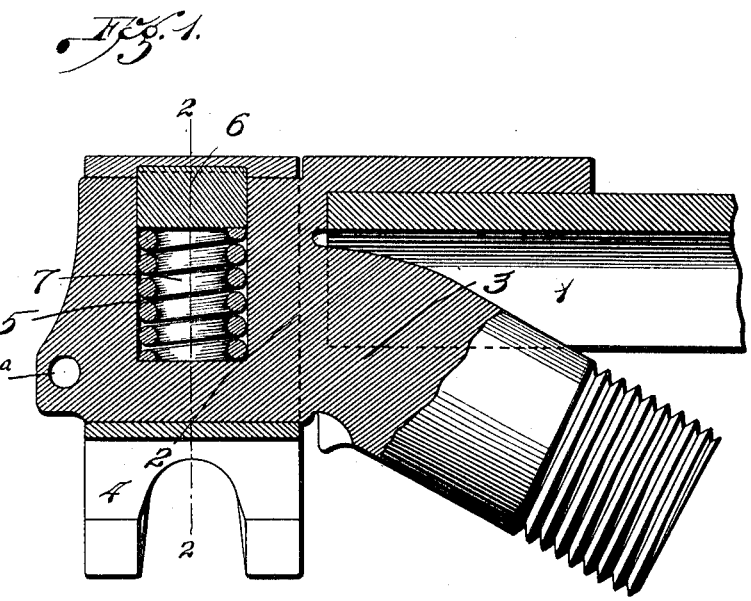
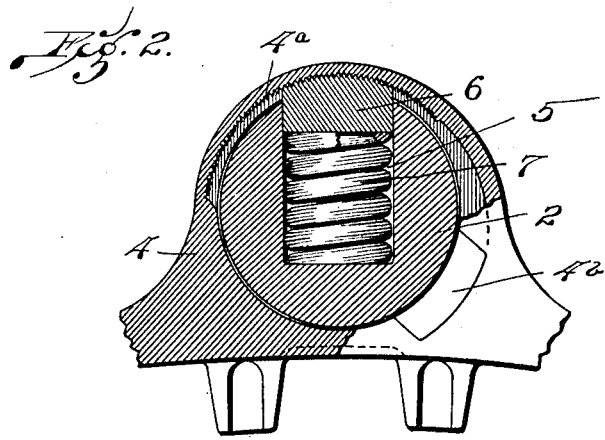
WITNESSES:
E. M. Harrington
M. L. Smith
INVENTOR:
E. A. Le Beau.
By J. R. Cornwall
ATTY.
COLUMBIA PLANOGRAPH CO., WASHINGTON, D. C.

UNITED STATES PATENT OFFICE.

ERNEST A. LE BEAU, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

1,020,563.     Specification of Letters Patent.     Patented Mar. 19, 1912.

Application filed August 11, 1909. Serial No. 512,414.

*To all whom it may concern:*

Be it known that I, ERNEST A. LE BEAU, a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a vertical sectional view through one end of a brake beam showing my improved method of adjustably mounting the brake head thereon. Fig. 2 is a sectional view on line 2—2 Fig. 1.

This invention relates to a new and useful improvement in brake beams, being designed particularly as an improvement upon that type of brake beam illustrated in the application of Charles H. Williams, Jr., filed June 28, 1909, Serial Number 524,825.

My present invention also involves the use of that class of adjustable brake heads illustrated in the patent of Robischung #485,823 dated November 8, 1892. In my present construction the locking block is mounted in the end casting, which serves as a thrust block to receive the compression member, which casting is provided with an extension constituting part of the tension member, said casting also providing a mount for the brake head. The yielding locking block is housed in the casting beyond the end of the compression member hence may be pressed outwardly in any direction within the circle of the mount for the brake head.

In a companion application filed by me June 3, 1909, Serial No. 499,915, I have illustrated an interiorly arranged locking block of the character illustrated in the accompanying drawings, but in such companion application, the presence of the compression member which extends outwardly beyond the compression block, restricts, to an extent, the location of such locking block, and, furthermore, limits the size and strength of the spring coöperating with said block.

In the accompanying drawings 1 indicates the compression member which is preferably U-shaped in cross section.

2 is the end casting having an obliquely disposed extension constituting part of the tension member, the said casting also affording a seat for the end of the compression member, and also providing a mount for the brake head 4.

5 is a recess in casting 2, which may be disposed in any direction depending upon the direction in which it is desired to have the spring exert its compression.

6 is a locking block having a serrated outer face, said locking block being pressed outwardly by spring 7.

The brake head 4 has part of its socket provided with serrations $4^a$ to coöperate with the serrations on the locking block 6. The serrations $4^a$ are preferably in the bottom of a channel so that when the locking block is pressed outwardly thereagainst, the said locking block tends to prevent longitudinal displacement of the brake head.

To assemble the parts, the brake head is provided with an opening $4^b$ leading into the eccentrically arranged channel which is a continuation of the channel containing the serrations $4^a$. The opening $4^b$ receives the locking block and enables the head to be slid longitudinally to its position on the casting after which it is rotated, the eccentric curve of the plain face of the channel forcing the locking block inwardly to produce the necessary compression of the spring when the head is revolved into proper position. To provide additional means to prevent longitudinal displacement of the head, a cotter pin may be introduced into the opening $2^a$ at the end of the casting, if desired.

I claim:

1. In a brake beam, the combination with a compression member, of a thrust member against which said compression member is seated, a tension rod connected to said thrust member, a brake head removably mounted on said thrust member beyond said compression and tension members, and a spring pressed locking block mounted in said thrust member and coöperating with said brake head.

2. A thrust block for a brake beam comprising a casting having a seat for a compression member and means for the attachment of a tension member thereto, said casting extending outwardly beyond the points where the said compression and tension members are attached to provide for a brake head, and said mount being chambered to receive a locking block.

In testimony whereof I hereunto affix my signature in the presence of two witnesses, this 2nd day of August 1909.

ERNEST A. LE BEAU.

Witnesses:
 EDWARD T. WALKER,
 M. F. HUNTOON.

---

Copies of this patent may be obtained for five cents each, by addressing the "Commissioner of Patents, Washington, D. C."